(12) United States Patent
Ezekiel

(10) Patent No.: US 8,398,053 B2
(45) Date of Patent: Mar. 19, 2013

(54) DOUBLE PISTON TRUNNION MOUNTED BALL VALVES AND METHODS OF USE

(75) Inventor: Mark Ezekiel, Magnolia, TX (US)

(73) Assignee: BP Corporation North America Inc., Houston, TX (US)

( * ) Notice: Subject to any disclaimer, the term of this patent is extended or adjusted under 35 U.S.C. 154(b) by 299 days.

(21) Appl. No.: 12/767,582

(22) Filed: Apr. 26, 2010

(65) Prior Publication Data

US 2010/0276620 A1 Nov. 4, 2010

Related U.S. Application Data

(60) Provisional application No. 61/173,740, filed on Apr. 29, 2009.

(51) Int. Cl.
*F16K 25/00* (2006.01)
(52) U.S. Cl. ............... 251/180; 251/214; 251/315.08
(58) Field of Classification Search ............ 251/175, 251/180, 315.08, 315.09, 314, 316, 317, 251/317.01, 214
See application file for complete search history.

(56) References Cited

U.S. PATENT DOCUMENTS

| 4,260,131 | A | * | 4/1981 | Kindersley | 251/214 |
| 4,383,546 | A | * | 5/1983 | Walters, Jr. | 137/240 |
| 4,524,946 | A | * | 6/1985 | Thompson | 251/88 |
| 4,566,482 | A | | 1/1986 | Stunkard | |
| 4,637,421 | A | * | 1/1987 | Stunkard | 137/327 |
| 4,658,847 | A | * | 4/1987 | McCrone | 137/72 |
| 5,193,780 | A | | 3/1993 | Franklin | |
| 6,708,946 | B1 | | 3/2004 | Edwards et al. | |

FOREIGN PATENT DOCUMENTS

WO   WO 93/03255   2/1993

OTHER PUBLICATIONS

West Coast Lockwasher, "Belleville Disc Springs", www.wclco.com, WCL Fastener Co., Mar./Apr. 2010, 95 and 96, Industy, CA.*
West Coast Lockwasher, "Spring Washers", www.wclco.com, WCL Fastener Co., Mar./Apr. 2010, 5-9, Industy, CA.*
West Coast Lockwasher, "Crescent Spring Washers", www.wclco.com, WCL Fastener Co., Mar./Apr. 2010, 10-44, Industry, CA.
West Coast Lockwasher, "Basic Information for measurement and function of a Disc Spring", www.wclco.com, WCL Fastener Co., Mar./Apr. 2010, 96-109, Industry, CA.
West Coast Lockwasher, "Belleville Disc Springs", www.wclco.com, WCL Fastener Co., Mar./Apr. 2010,95 & 96, Industry, CA.
West Coast Lockwasher, "Single Wave Flat Rim Washers", www.wclco.com, WCL Fastener Co., Mar./Apr. 2010, 45; 68 & 69, Industry, CA.
West Coast Lockwasher, "Spring Washers", www.wclco.com, WCL Fastener Co., Mar./Apr. 2010, 5-9, Industry, CA.
West Coast Lockwasher, "Three Wave Spring Washers", www.wclco.com, WCL Fastner Co., Mar./Apr. 2010, 46-70, Industry, CA.

(Continued)

*Primary Examiner* — Eric Keasel
*Assistant Examiner* — Reinaldo Sanchez-Medina
(74) *Attorney, Agent, or Firm* — Barbara A. Fisher

(57) ABSTRACT

Disclosed are a method and a ball valve structure which provide for an improved seal in a trunnion mounted, double piston ball valve, which is especially useful in applications requiring a seal against high pressures, such as in the oil, gas and chemical process industries. Higher pressures on an inlet side of the valve are used, while the valve moves toward and is maintained in a valve closed position, to create movement of a ball element of the valve so as to bias the ball element against both piston seat elements (or rings) used to create the seals. This movement of the ball element thereby effectively uses such upstream pressure to create and enhance a seal between the ball element and both piston seat elements while in the valve closed position.

23 Claims, 6 Drawing Sheets

OTHER PUBLICATIONS

"Parts for High Pressure Small Size Diameter Valves", Series 5700/6700, www.wclco.com, WCL Fastener Co., Mar./Apr. 2010, 18-20.
West Coast Lockwasher, "Finger Washers", www.wclco.com, WCL Fastener Co., Mar./Apr. 2010, 70.

West Coast Lockwasher, "Special Spring Washers", www.wclco.com, WCL Fastener Co., Mar./Apr. 2010, 68-69.
International Search Report and the Written Opinion of PCT/US2010/032564 filed on Apr. 27, 2010, dated Sep. 9, 2010.

* cited by examiner

DOUBLE PISTON TRUNNION MOUNTED BALL VALVES AND METHODS OF USE

CROSS-REFERENCE TO RELATED APPLICATIONS

The present application claims priority under 35 U.S.C. §119(e) to U.S. Provisional Application Ser. No. 61/173,740, filed Apr. 29, 2009, which is incorporated by reference herein in its entirety.

BACKGROUND INFORMATION

1. Technical Field

The present disclosure relates to methods and valves for controlling the flow of fluid through a bore and more particularly, the disclosure relates in some embodiments to methods and ball valves for use in the oil and chemical process industry. More particularly, this disclosure relates to double piston, trunnion-mounted ball valves.

2. Background Art

Ball valves are commonly used in both the oil and chemical process industries. A type of ball valve used to control flow of a fluid is an apertured ball valve such as is disclosed in PCT Patent Application No. WO 93/03255 published on Feb. 18, 1993, incorporated by reference herein. In an apertured ball valve the valve operation or function may be broken down into two separate stages. Firstly, the ball moves between an open and a closed position by rotating through 90 degrees such that the ball aperture from an orientation coaxial with the flow direction, i.e. when the valve is open, to a position whereby the ball aperture is normal or perpendicular to the flow direction and the valve is closed. Secondly, the valve seals in the closed position to prevent flow through the bore across the ball valve. Therefore, the on-off control of flow through the valve is achieved by rotating the ball through 90° within the valve housing. Another ball valve is disclosed in U.S. Pat. No. 6,708,946, the teachings of which are incorporated herein by reference.

There are two basic types of ball valve mechanisms which currently exist. First, there is the trunnion mounted ball system in which the ball element is positionally constrained inside the valve, usually by radial bearings. The ball is rotated by the application of torque through a valve stem to the trunnion. Sealing occurs as a result of the valve seat on the upstream (or high pressure) side of the valve "floating" onto the ball element and causing engagement between a surface of the valve seat and the surface of the ball. The advantage of this system is that it provides highly reliable rotation between the valve open and the closed positions. The principal disadvantage of this system is that seal reliability is reduced because the sealing force only develops in proportion to the annular area of the valve seat. Further, in high pressure applications, the force exerted on the ball on the upstream side of the valve can result in deformation of the ball and leakage between the ball and another valve seat located on the downstream (or lower pressure) side of the valve. Thus, when trunnion mounted ball systems are used in high pressure wells and especially those in which the well fluid has a high proportion of particulate matter, being generally known as "aggressive" wells, the pressure is such that fluids and/or particulate matter may leak past seals between the ball and the valve seats. This often results in the valve not achieving integrity of sealing. In such cases, this type of ball valve is unable to operate properly in such conditions.

The second type of ball valve mechanism which effects the abovementioned function is known as the "floating ball system". In this system the ball is not positionally constrained relative to the valve body. Rotation is caused by the application of force to a point which is offset from the ball centre which, in conjunction with the mating curvatures of the ball and seat, cause the ball to rotate. Sealing occurs as a result of the ball "floating" onto the valve seat. The advantage of this mechanism is that the reliability of the seal is increased, because the sealing force develops in proportion to the circular area of the ball to seat contact. The disadvantage of this type of mechanism is that the rotational reliability is reduced as the friction factor between the ball and seat are considerably larger than that of trunnion mounted devices. With high pressure and aggressive types of wells and particulate flows of the type described above, the reliability of this valve in those applications creates a problem in that the torque necessary to rotate the ball becomes excessively high, and thus, the valve can seize between the open and the closed position giving rise to serious problems in both operational and safety terms.

It would be desirable to provide a method and/or improved ball valve design which may obviate or mitigate at least one or more of the aspects associated with the aforementioned disadvantages.

SUMMARY OF THE DISCLOSURE

The above disadvantages may be addressed by embodiments of the method and ball valve structure as disclosed herein wherein higher pressures on the inlet side of the valve are used, while the valve moves toward and is maintained in the valve closed position, to create movement of a ball element of the valve so as to bias the ball element against both of the piston seat elements (or rings) used to create the seals in a double piston ball valve and thereby effectively create and enhance a double seal within the valve while in the valve closed position.

Thus, in one aspect, the disclosure is directed to a double piston, trunnion-mounted ball, valve structure comprising:
 (a) a valve body defining an internal cavity and a longitudinal bore;
 (b) a rotatable, longitudinally moveable ball element positioned in the cavity and comprising a fluid flow passage therethrough when in a flow position;
 (c) first and second longitudinally moveable piston seats, the first seat located upstream of the ball element, the second seat located downstream of the ball element; and
 (d) a trunnion assembly fixedly engaging the ball element, one or more portions of the trunnion assembly disposed within one or more corresponding recesses of the valve body, each recess having a bias element exerting force on the trunnion assembly to oppose a load force acting on the ball element.

In certain embodiments the valve body comprises a bonnet, and the trunnion assembly comprises a lower trunnion, a portion (or portions) of which is/are slideably disposed within one or more recesses in the valve body, and an upper trunnion, a portion (or portions) of which is/are slideably disposed within one or more recesses in the bonnet, the respective recesses receiving or containing respective bias elements. Trunnions may be integral or non-integral with the ball element of the ball valve structures described herein. Ball valve structures in accordance with the present disclosure comprise a valve stem rigidly affixed to the upper trunnion and extending through an aperture in the bonnet. In certain embodiments, the piston seat located downstream of the ball element is slideable downstream in the valve body until reaching a fixed position where the downstream piston seat contacts the valve body and is then restricted in further downstream movement. In certain embodiments, the bias elements comprise components and materials allowing for controlled movement of the ball element within the cavity upon movement of the ball element due to application of the load force causing the ball element to sealingly engage with the downstream piston seat.

In certain embodiments, the bias elements are independently selected from the group consisting of wave springs, crescent springs, spring washers, belleville springs (also known as disc or cone washers), and combinations thereof, including stacks of two or more of these. Any of these may have contact flats, as further explained herein. It will be understood by those skilled in the art that the terms "washer" and "spring" are used interchangeably in this art. In fact, sometimes the terms "spring washers" and "washer springs" are employed for the same meaning for the same component and function. Coil springs may be used in certain embodiments. To avoid confusion, the term "bias element" is used when describing the entire component in a particular recess, whether a single spring or washer, or a plurality of springs or washers stacked in any manner. As used herein the term "bias element" means one or more components that function to exert an opposing, resisting force to an adjacent element exerting a force upon it. In the context of apparatus and methods of the present disclosure, one or more bias elements are employed to oppose a force that is applied to the upstream seal seat that contacts and sealably engages with the ball element from a higher pressure side of the valve when the ball valve is in a valve closed position. The bias elements may be present in recesses in the valve bonnet and/or valve body.

In certain embodiments the bias elements may be composite in nature, for example one or more belleville springs stacked together with one or more wave springs in one or more of the recesses. In these embodiments, the material, diameter (internal and outer), thickness, deflection, percent deflection, and other properties of the individual springs or washers may be the same or different. Disc springs, and others described herein, may be stacked together in certain bias element embodiments to enhance and/or adjust performance characteristics. In certain bias element embodiments the washers or springs may be stacked in parallel, which enhances load bearing characteristics. In certain other bias element embodiments, washers may be stacked in series, as described further herein. Combination stacking, in parallel and in series, may increase both load bearing and deflection. Belleville springs and other types of disc springs mentioned above may be used in varying thickness in the same bias element to achieve particular performance objectives.

In certain embodiments, the ball valve structure comprises:
(a) a housing comprising a valve body and a bonnet which define a cavity (void space) within the housing and also a bore having a longitudinal axis which runs through the bore, the bore allowing for passage of fluids from a higher pressure inlet to the ball valve structure, through the bore, and then from a lower pressure outlet of the ball valve structure when the ball valve structure is in a valve open position;
(b) a ball element fitting within the cavity of the housing and slideably moveable in both directions along a path aligned and substantially parallel with the longitudinal axis, the ball element disposed within the cavity of the housing such that the ball element may also be rotated between a first position in which the ball element is oriented such that a hollow aperture within the ball body is aligned with the longitudinal axis of the bore, this first position defining the valve open position, and a second position in which the ball element is rotated through approximately 90° such that the ball body fully obstructs the bore, this position defining a valve closed position, the ball element comprising:
(i) a ball body having the hollow aperture therein, such that when the hollow aperture aligns with the longitudinal axis of the bore in the valve open position, the hollow aperture thereby permits a flow of fluids through the bore;
(ii) a lower trunnion disposed at a lower end of the ball body and fixedly engaged with the ball body, the lower trunnion being disposed within a recess of the valve body such that the lower trunnion may slideably move therein, the recess of the valve body receiving a first bias element;
(iii) the first bias element exerting an opposing force on the lower trunnion to oppose a load force which acts to push against the ball element from the higher pressure inlet side of the ball valve structure when in the valve closed position;
(iv) an upper trunnion disposed at an upper end of the ball body and fixedly engaged with the ball body, the upper trunnion being disposed within a recess of the bonnet such that the upper trunnion may slideably move therein, the recess of the bonnet receiving a second bias element;
(v) the second bias element exerting an opposing force on the upper trunnion to oppose a load force which acts to push against the ball element from the higher pressure inlet side of the ball valve structure when in the valve closed position, and
(vi) a stem rigidly affixed to the upper trunnion and extending through an aperture in the bonnet so that the ball valve structure may be actuated between the valve open position and the valve closed position by rotation of the stem, the stem slideably moveable within the aperture in the bonnet to accommodate movement of the ball element due to the opposing forces and load forces acting on the lower and upper trunnions of the ball element when in the valve closed position;
(c) a first piston seat located at the higher pressure inlet to the ball valve structure and positioned within the valve body such that the first piston seat may slideably move along the longitudinal axis within the valve body, the fluid pressure at the higher pressure inlet being used to exert a load force against the first piston seat such that the first piston seat may sealingly engage with the ball body and exert the load force against the upper trunnion and the lower trunnion, thereby causing movement of the ball element along the longitudinal axis within the housing; and
(d) a second piston seat located at the lower pressure outlet to the ball valve structure and positioned within the valve body such that the second piston seat may slideably move along the longitudinal axis within the valve body until reaching a fixed position where the second piston seat contacts the valve body and is restricted in movement along the longitudinal axis in one direction, and further wherein the movement of the ball element due to application of the load force in (c) causes the ball body to also sealingly engage with the second piston seat and the first and second bias elements allowing for controlled movement of the ball element within the cavity of the housing.

In another aspect, the disclosure is directed to a method for creating a seal in a double piston-type trunnion-mounted ball valve comprised of a ball element with an aperture therein defining a bore for fluid communication between an inlet and outlet to the ball valve when in a valve open position, the bore also defining a longitudinal axis that lies within the bore aligned in the direction of fluid flow when in a valve open position, a first piston seat located at the inlet to the ball valve having a higher fluid pressure when in a valve closed position, and a second piston seat located at the outlet to the ball valve having a lower fluid pressure when in the valve closed position. The method comprises:

(a) rotating the ball element to the valve closed position until the higher fluid pressure at the inlet to the ball valve creates a load force that is applied to the first piston seat so that the first piston seat sealingly engages with the ball element and creates a first seal, the load force also causing the ball element to move due to application of the load force and thereby sealingly engage with the second piston seat and create a second seal; and (b) applying one or more opposing forces to the ball element such that movement of the ball element in (a) is controlled.

These and other features of apparatus and methods of this disclosure will become more apparent upon review of the brief description of the drawings, detailed description, and claims that follow.

BRIEF DESCRIPTION OF THE DRAWINGS

The manner in which the objectives of this disclosure and other desirable characteristics can be obtained is explained in the following description and drawings included herein in which.

Figure 1:
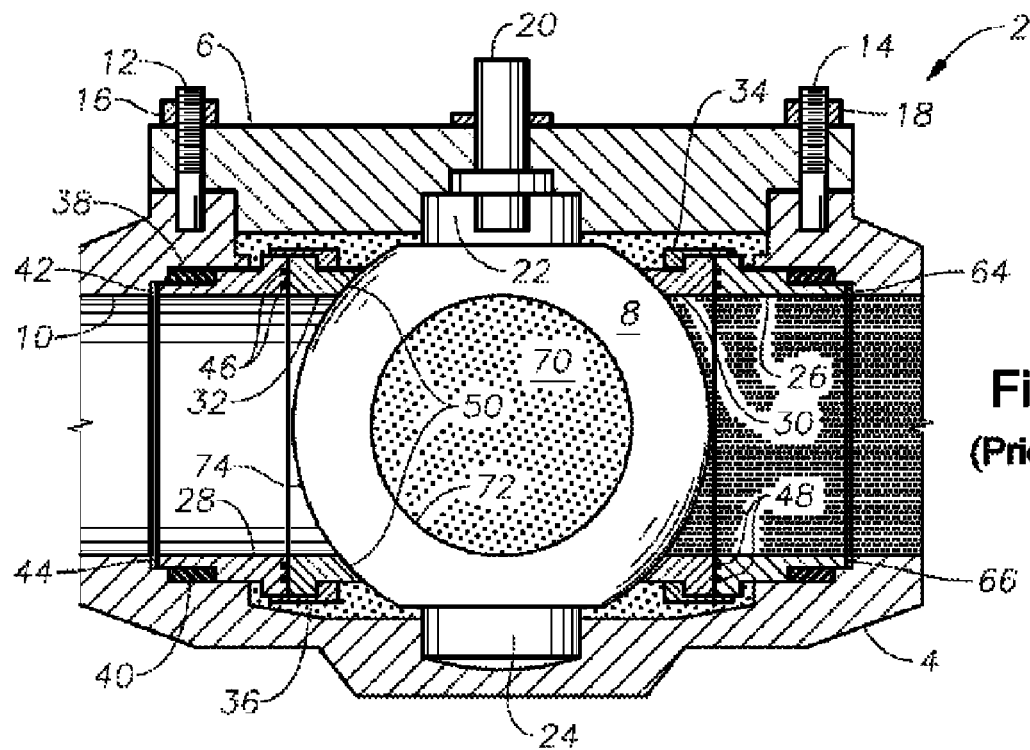
FIG. 1 is a schematic cross-sectional view of a conventional (prior art) trunnion-mounted double piston ball valve.

It is to be noted, however, that the appended drawings are not to scale and illustrate only typical embodiments of this disclosure, and are therefore not to be considered limiting of its scope, for other equally effective embodiments may become apparent after reading this disclosure.

DETAILED DESCRIPTION

In the following description, numerous details are set forth to provide an understanding of the disclosed methods and apparatus. However, it will be understood by those skilled in the art that the methods and apparatus may be practiced without these details and that numerous variations or modifications from the described embodiments may be possible.

This disclosure relates in embodiments to double piston, trunnion-mounted ball valves. This valve type is used for double isolation in one valve, however, recently a failure mode has been identified in large, high pressure valves, which under the condition of high upstream pressure and low valve cavity (void space) pressure, there can be leakage between the cavity and downstream side of the valve. The cause of the leakage is due to differential movement between the ball and a downstream seat ring. The ball is deflected on the downstream side by upstream pressure, but it is believed that the downstream seat lacks sufficient pressure load in order to deform the seat and to maintain contact with the deformed ball. At high pressure the valve seals, as the seat ring is deformed by the pressure and it is able to follow the deformed shape of the ball.

The failure mode discussed above limits the functionality of the valve. Design optimization using a stiff ball, flexible seat rings and additional spring loading on the seat ring have heretofore either not been successful, or only successful by introducing additional complexity into the design and manufacture of the valves.

The valves and methods of using same herein disclosed have two primary features. The downstream seat is partially loaded by upstream pressure, and not solely cavity (void space) pressure, effectively putting the valve into the "both seals energized from upstream pressure" category. Second, the additional loading on the downstream seat using applied force derived from upstream pressure at least minimizes and may eliminate the effects associated with the failure mode discussed above.

Ball elements in ball valve embodiments of the present disclosure are supported on trunnion bearings, such that pressure load when sealing is transferred into the valve body. Hence the name trunnion mounted ball valve. The valve preferentially seals on the upstream side.

A different, prior art design of valve exists where the ball element is supported entirely by the seats—a seat supported design—and as discussed above this valve seals downstream and has no trunnions. The pressure load is taken by the seat to ball interface in this design. Seat supported designs can only be used at small sizes and low pressures. The ball to seat load becomes so great on the larger sizes/higher pressures that the stem cannot turn the valve. The normal limit of seat supported valves is about 8 inches (about 20 cm), class 300.

Ball valves and methods of using same of the present disclosure include one or more bias elements for applying an opposing force to the upper and lower trunnion supports. As defined earlier herein, bias elements may comprise one or more springs which may be used to apply an opposing force to counter the applied force derived from the higher pressure upstream of the valve. Such spring devices may be independently selected from the group consisting of wave washers, crescent washers, spring washers, Belleville washers (also known as disc or cone washers), and combinations thereof, including very stiff Belleville-type springs, and stacks of two or more of these. The springs are designed/adjusted so that with high pressure on the upstream side, the ball element is allowed to move toward the downstream seat, with the limit of movement controlled by the bias elements, until the seat ring contacts the valve body. At that point, the ball then starts to load the downstream seat, producing a downstream seat seal driven by upstream pressure. The bias elements desirably do not permit the entire upstream pressure load to be applied to the ball and downstream seat, so the valve remains operable (in other words, a human or electro-mechanical operators may turn the valve without undue effort). The upstream seat retains the original loading.

Referring now to the drawing figures, in which the same numerals are used in the various figures for the same elements unless otherwise noted, FIG. 1 illustrates schematically a cross-sectional view of a conventional (prior art) trunnion-mounted double piston ball valve 2 having a valve body 4, a bonnet 6, and ball element 8. Valve body 4 defines a valve bore 10. One or more bolts 12, 14 and nuts 16, 18 are used to fasten bonnet 6 to valve body 4 in conventional fashion. Valve 2 also comprises a valve stem 20 connected to an upper trunnion 22, while a lower trunnion 24 is positioned within a lower portion of valve body 4. Valve 2 further comprises a first, upstream piston 26, and a second, downstream piston 28, each having respective ball seals 30, 32. An upper connector ring 34 and a lower connector ring 36 connect respective piston seals to their pistons. Upper and lower elastomeric O-ring seals 38, 40 are provided as illustrated.

At this point it is important to note the gaps 42, 44, 64, and 66. Gaps 42 and 44 are between valve body 4 and downstream edges of downstream piston 28, while gaps 64 and 66 are between valve body 4 and upstream edges of upstream piston 26.

Still referring to FIG. 1, valve 2 comprises upper and lower dual O-rings 46, 48, which form seals between ball seal 32 and downstream piston 28, and between ball seal 30 and upstream piston 28, respectively as illustrated.

Ball element 8 comprises an aperture 70 defined by an internal surface 72, and an external surface 74. A limitation of prior art valve 2 is the possibility of leakage at points of contact 50 between ball element external surface 74 and downstream piston seal 32, as the downstream pressure is frequently too low to provide a good seal.

Figure 2:
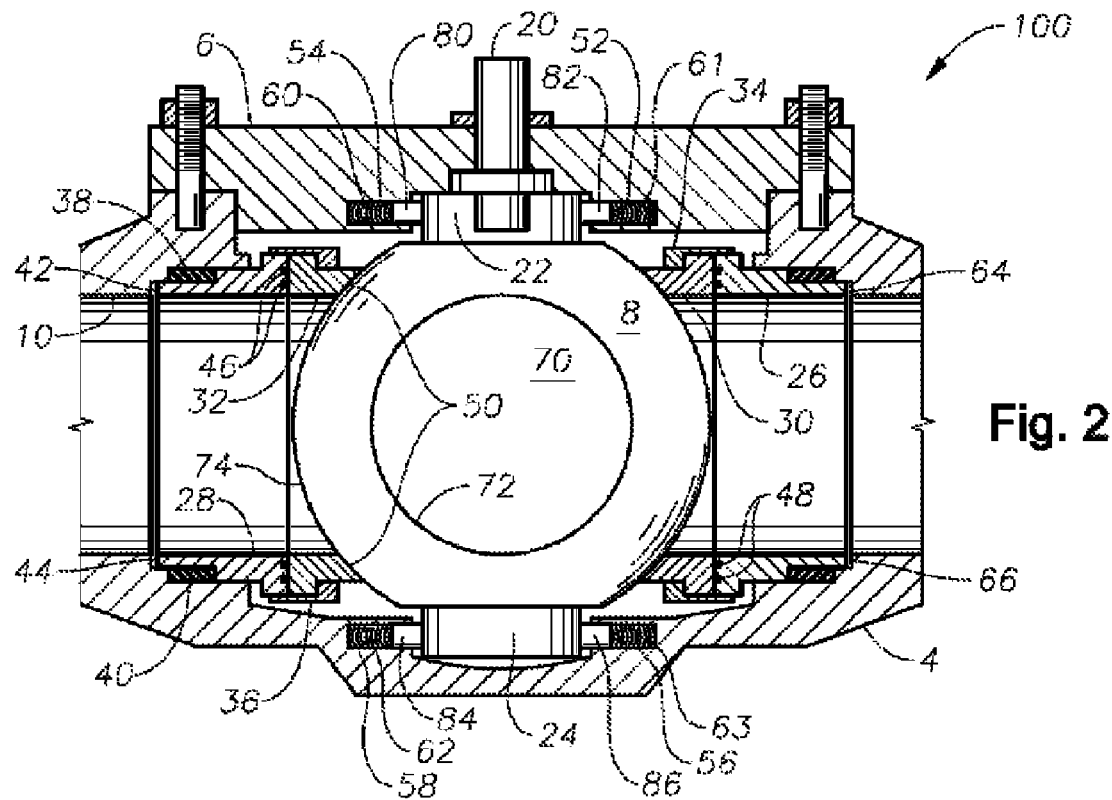
FIG. 2 is a schematic cross-sectional view of a first embodiment of a trunnion-mounted double piston ball valve according to the present disclosure comprising one or more spring devices as bias elements employed to oppose a force that is applied to the upstream seal seat that contacts and sealably engages with the ball element from a higher pressure side of the valve when the ball valve is in a valve closed position.
Figure 8A:
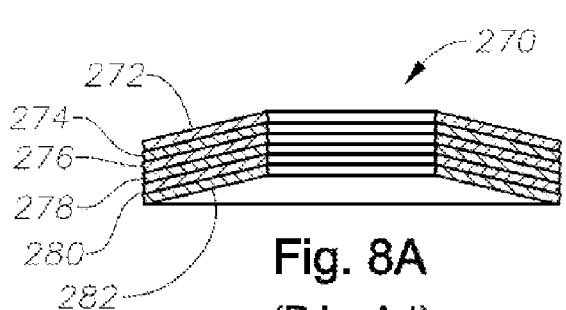
Figure 16A:
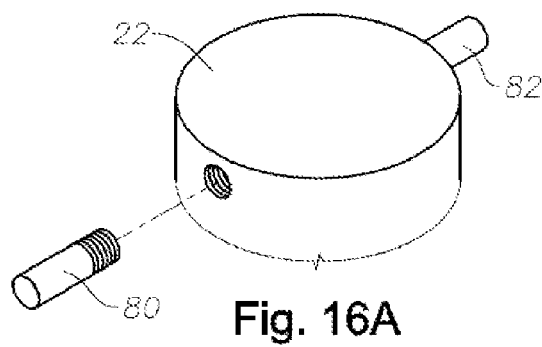
FIGS. 16 and 17 illustrate schematically two alternative embodiments for modified trunnions useful in apparatus of this disclosure.
Figure 17A:
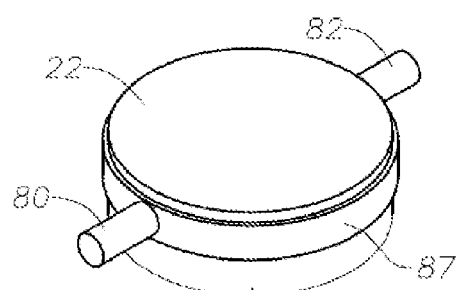
Figure 16B:
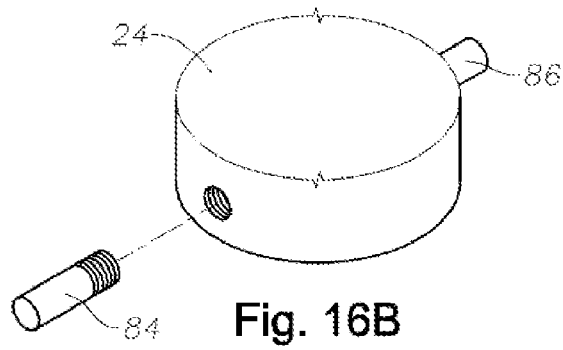
Figure 17B:
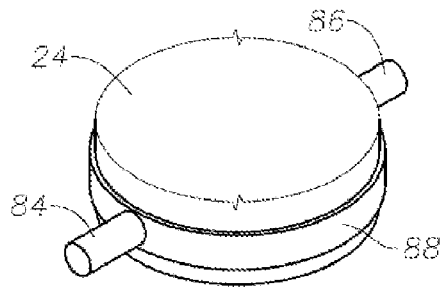

FIG. 2 is a schematic cross section view of a trunnion-mounted, double piston ball valve embodiment 100 according to the present disclosure. Ball valve embodiment 100 comprises certain mechanical and function features not present in prior art ball valve 2 illustrated in FIG. 1. First, note that ball valve 100 includes modified trunnions 22, 24. Upper trunnion 22 includes posts 80, 82 that extend into respective recesses 54, 52 in bonnet 6, as well as spring bias elements 60, 61 disposed in recesses 54, 52, respectively. A similar arrangement is present on the lower trunnion 24, which is modified to include posts 84, 86 that extend into respective recesses 58, 56 in valve body 4, as well as spring bias elements 62, 63 disposed in recesses 58, 56, respectively. In embodiment 100 of FIG. 2 posts 80, 82, 84, and 86 are illustrated as integral with their respective trunnions; however, posts 80, 82, 84, and/or 86 could just as well be separate posts screwed or otherwise mounted into trunnions 22, 24, as illustrated in FIGS. 16A and 16B. Another alternative would be to have two separate upper and lower rings or bushings, 87, 88, as illustrated in FIGS. 17A and 17B, upper ring 87 having extensions 80, 82 extending therefrom 180 degrees apart, and extension 84, 86 extending from lower ring or bushing 88 and positioned 180 degrees apart. The rings may be loosely placed in position during construction of the valve, or may be welded or brazed to the trunnions. The posts or extensions 80, 82, 84, and 86 may generically be referred to as "portions." None of the portions 80, 82, 84, 86, recesses 52, 54, 56, 58, or bias elements 60, 61, 62, and 63 are present in prior art ball valves, nor are the two alternative arrangements mentioned above known in the prior art. In embodiment 100, bias elements 60, 61, 62, and 63 may be as illustrated in FIG. 8A (parallel stack). Functionally, bias element 60, 62 apply an opposing force to the trunnions to oppose a force that is applied to upstream piston seal seat 30 that contacts and sealably engages with ball element 8 from a higher pressure upstream side of the valve when the ball valve is in a valve closed position.

Figure 3:
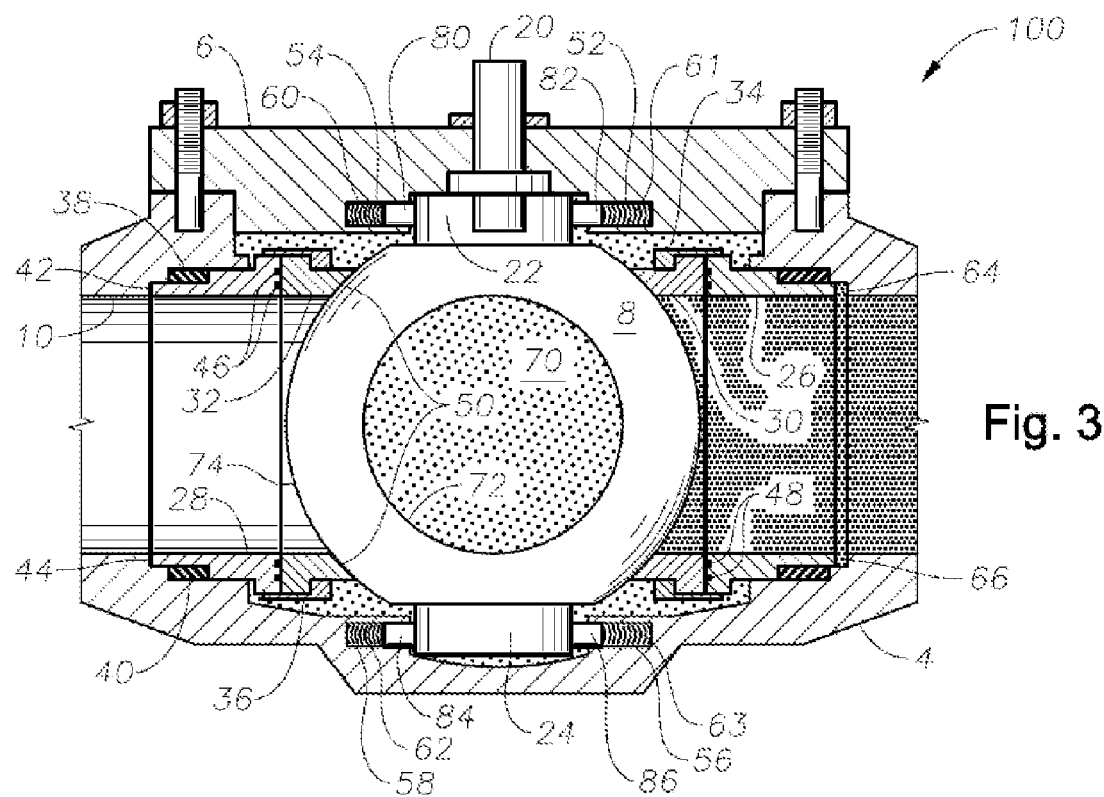
FIG. 3 is a further schematic cross-sectional view of the ball valve embodiment illustrated in FIG. 2.

FIG. 3 is a further cross sectional view of ball valve embodiment 100 illustrated in FIG. 2 under upstream pressure. As can be seen in FIG. 3, under application of upstream pressure, ball element 8 will be pushed over to downstream, piston seat 32. The contact force between downstream piston seat 32 and ball element 8 will be controlled by bias springs 60, 61, 62, and 63. Notice that gaps 42, 44, have been reduce to zero, while gaps 64, 66 have increased, bias elements 60, 62 have contracted, while bias elements 61, 63 have expanded in the downstream direction, providing controlled downstream movement of ball element 8 and pistons 26, 28, and improving sealing at 50.

Figure 4:
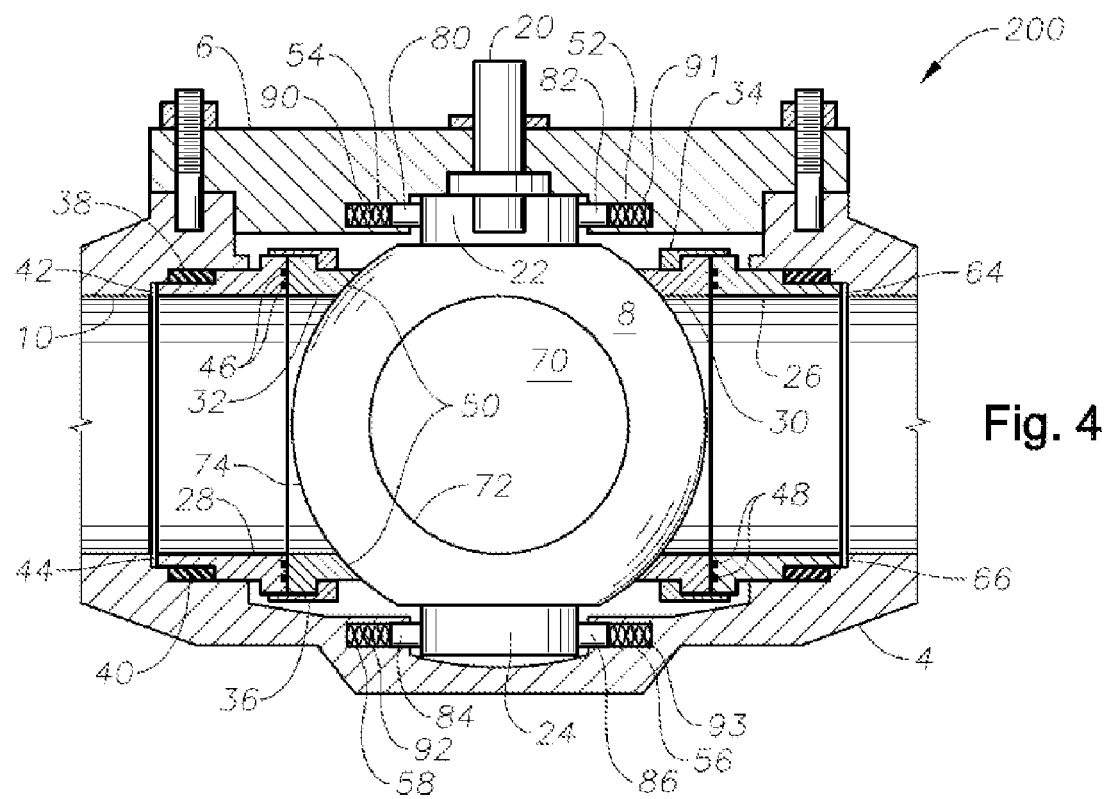
FIG. 4 is a schematic cross-sectional view of a second embodiment of a trunnion-mounted double piston ball valve according to the present disclosure comprising a different type of spring element as bias elements employed to oppose a force that is applied to the upstream seal seat that contacts and sealably engages with the ball element from a higher pressure side of the valve when the ball valve is in a valve closed position.
Figure 5:
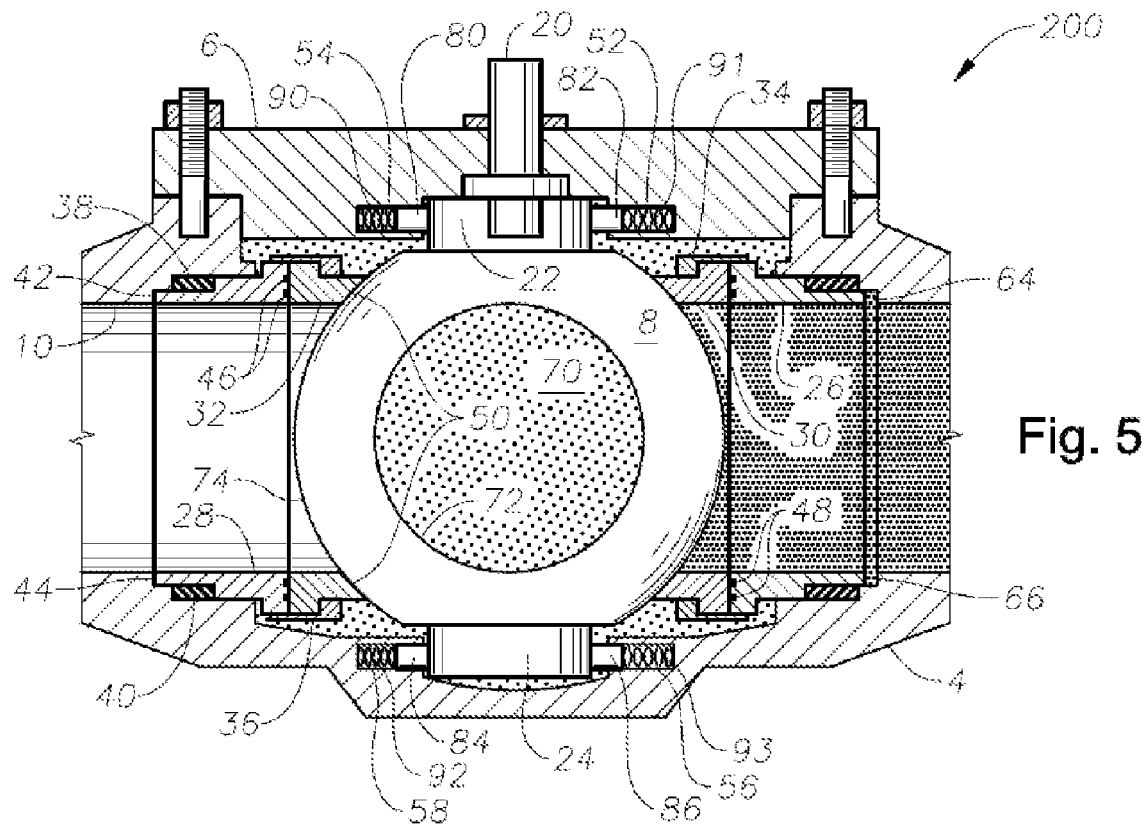
FIG. 5 is a further schematic cross-sectional view of the ball valve embodiment illustrated in FIG. 4.
Figure 8B:
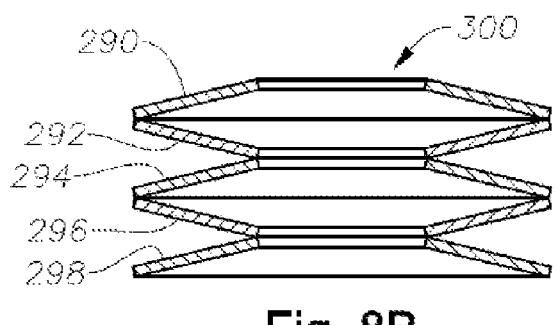

FIGS. 4 and 5 are schematic cross-sectional views of a second ball valve embodiment 200 in accordance with the present disclosure. Embodiment 200 of FIGS. 4 and 5 is similar to embodiment 100 illustrated schematically in FIGS. 2 and 3 except that bias elements 90, 91, 92, and 93 are employed having a series configuration as illustrated in FIG. 8B.

Figure 6:
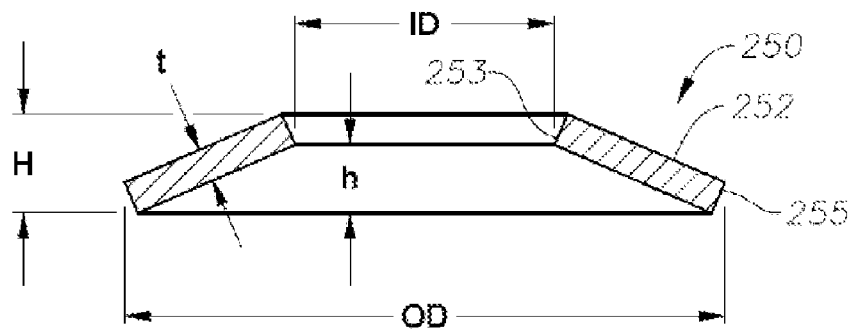
FIGS. 6-15 illustrate schematically various non-limiting embodiments of bias elements useful in various ball valve embodiments in accordance with this disclosure.
Figure 7:
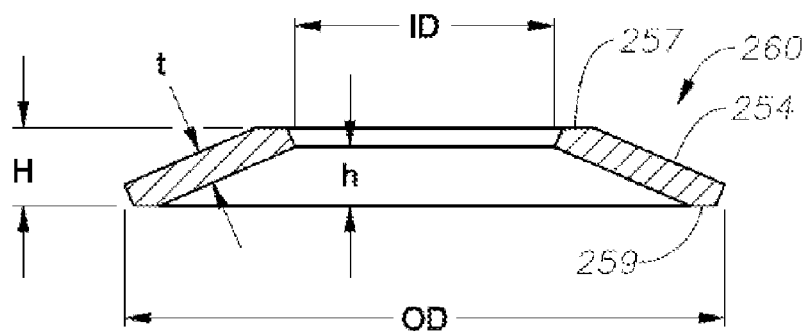

FIGS. 6-15 illustrate various non-limiting embodiments of bias elements useful in various ball valve embodiments in accordance with this disclosure. It will be understood that any of the various embodiments illustrated in FIGS. 6-15 may be used, alone or in conjunction with other types illustrated herein, in ball valve embodiments 100 and 200. FIG. 6 illustrates a prior art conical spring 260, having a spring body 252, an inner hole 253 having an inner diameter ID, and an outer periphery 255 having diameter OD, as well as overall height H, cone height h, and thickness t. Embodiment 260 of FIG. 7 is similar to embodiment 250 of FIG. 6, except embodiment 260 includes an upper contact flat 257 and a lower contact flat 259. Certain local standards may require that a contact flat 257 should be applied to the top inside diameter and a second contact flat 259 to the bottom outside diameter of the disc spring. For example, for disc springs with a material thickness greater than 6 mm, DIN 2093 specifies this. Contact flats 257, 259 may aid alignment of the disc springs during stacking, but may cause a reduction in the lever arm length and therefore an increase in the spring force. This is compensated by reducing the material thickness, which doesn't alter the overall height or spring force at 75% from the original disc but does increase the cone angle.

FIG. 8A illustrates a cross-sectional view of a parallel stack 270 of six identical Belleville springs, 272, 274, 276, 278, 280, and 282. FIG. 8B illustrates a cross-sectional view of a series stack 300 of five Belleville springs 290, 292, 294, 296, and 298. As noted by the web site of Belleville Springs Ltd., Arthur Street Lakeside, Redditch, B98 8JY, United Kingdom, single disc springs may be assembled 'opposed to each other' to form a spring column. This 'in series' formation (such as illustrated in FIG. 8B) is a means of multiplying the deflection of a single disc spring, while the force element remains as that for a single spring. For example, a disc spring that requires a force of 5000N to deflect 1 mm, when assembled to form a column of 10 disc springs in series, will require a force of 5000N to deflect 10 mm. The cumulative effect of bearing point friction of large numbers of disc springs stacked in series can result in the disc springs at each end of the stack deflecting more than those in the center. In extreme cases this may result in over-compression and premature failure of the end springs. A 'rule of thumb' according to Belleville Springs Ltd. is that the length of the stacked disc springs should not exceed a length approximately equal to 3 times the outside diameter of the disc spring. Normally, disc springs stacked in 'series' formation are of identical dimensions, however, it is feasible to stack numbers of disc springs of increasing thickness in order to achieve 'stepped' and progressive characteristics. With such arrangements, it may be necessary to provide some form of compression limiting device for the 'lighter' disc springs, to avoid over-compression whilst the 'heavier' springs are still in process of deflection.

Disc springs are assembled 'nested' inside each other, i.e. the same way up, the resultant force for such a column is the force element of a single disc spring multiplied by the number of 'nested' disc springs in the column, while the deflection remains the same as for that applicable to a single disc spring. This is the situation in embodiment 270 of FIG. 8A. As again explained by Belleville Springs Ltd., it should be realized that the individual disc springs in a column assembled in parallel perform as separate entities, thus generating considerable interface friction. For a given deflection, this interface friction will result in 3% increased force per interface, this must be taken into account when calculating the total force from parallel stacking. For example, a disc spring that requires a force of 5000N to deflect 1 mm, when assembled of 3 disc springs in parallel, will require a force of 15900N to deflect 1 mm. While any number of disc springs may be used in valve embodiments of the present disclosure, it may be advisable that the number of disc springs in parallel not normally exceed 3, or in extreme cases 5 springs, to minimize heat generated by friction or, in the case of static applications, to ensure a workable relationship between the loading and unloading characteristics. The hysteresis resulting from parallel stacking can be employed to advantage in those applications of a 'shock absorbing' nature, requiring a damping feature.

Figure 9A:
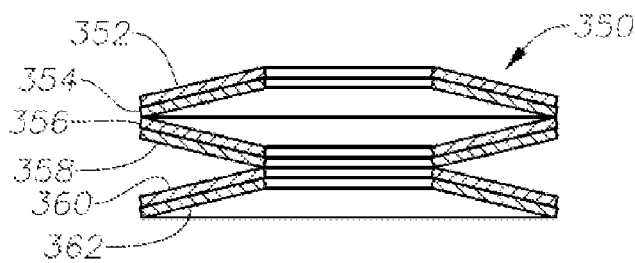

The life of disc springs in parallel arrangements may depend on adequate lubrication of the spring interfaces. Combinations of both series and parallel stacking, as in embodiment 350 of FIG. 9A, is a means of multiplying both force and deflection. Embodiment 350 includes a first parallel stack of disc springs 352, 354 pointing 'upward' stacked on top of a second parallel stack of disc springs 356, 358 pointing 'downward', in turn stacked upon a second upward pointing stack of disc springs composed of disc springs 360, 362. The guidelines applicable to this type of arrangement are basically those already outlined, but it may be advisable to minimize the number of springs in the stack by way of examining the various alternatives. An example given by Belleville Springs Ltd., may illustrate the point. For example, a disc spring that requires a force of 5000N to deflect 1 mm, when assembled to form a column consisting of 3 disc springs in parallel, and 10 units of 3 parallel discs in series—(total 30 discs), will result in a force requirement of 15900N to deflect the stack 10 mm—(incorporating an allowance of +6% for friction).

Figure 9B:
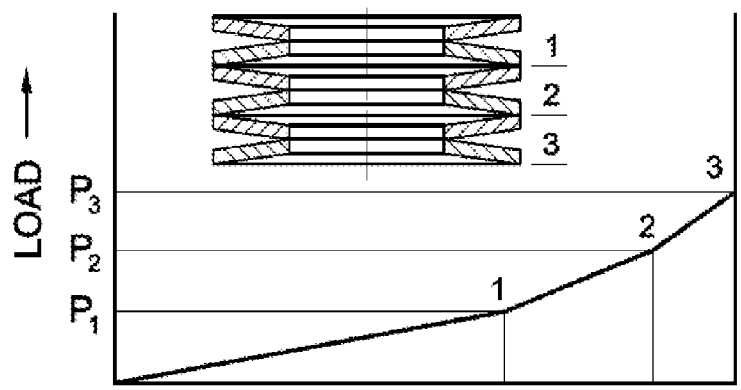
Figure 9C:
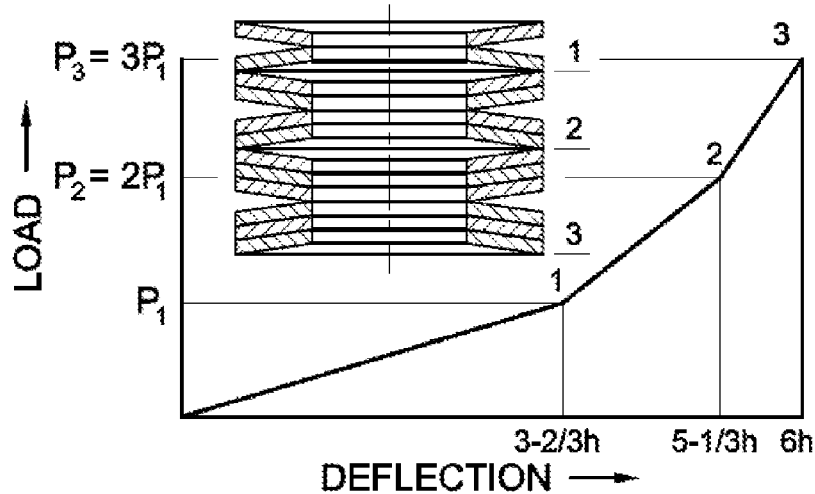
Figure 10A:
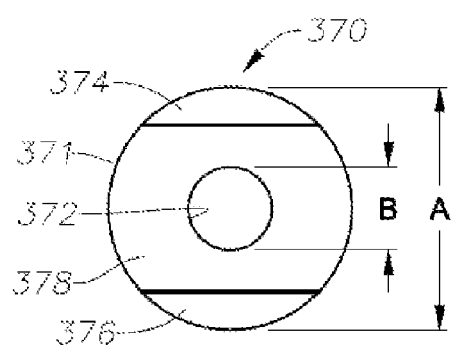
Figure 10B:
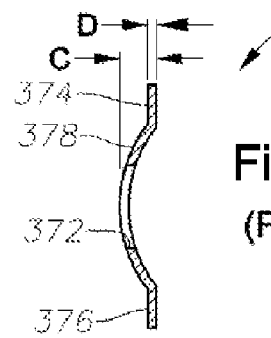

FIGS. 9B and 9C illustrate schematically the relationship of load to deflection for two different stacks of Belleville disc springs. It may be seen that the load for a given deflection, or conversely, the deflection for a given load, may be adjusted by the number and arrangement of identical disc springs. If the materials of the disc springs may be another variable, then it may be seen that the valve designer has many opportunities to achieve a successful ball valve design without undue experimentation.

FIGS. 10-15 provide schematic illustrations of further prior art disc spring embodiments that may be employed in the ball valves and methods of the present disclosure. FIG. 10A is a schematic plan view, and FIG. 10B a cross-sectional view, of a prior art single wave disc spring (flat rim) 370, having an outer periphery 371 having a diameter A, and an inner through hole 372 having a diameter B, a height C, and material thickness D. The flat rim may enhance load bearing capability and distribute load forces.

Figure 11A:
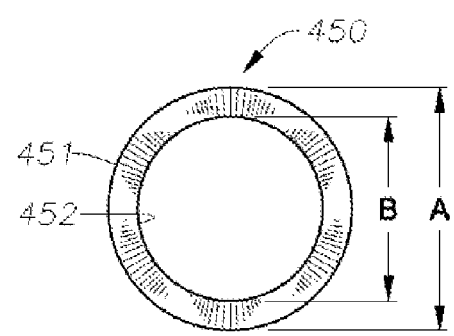
Figure 11B:
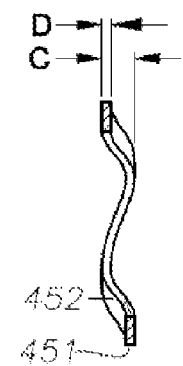

FIG. 11A is a schematic plan view, and FIG. 11B a cross-sectional view, of a prior art three wave disc spring 450, having an outer periphery 451 having a diameter A, and an inner through hole 452 having a diameter B, a height C, and material thickness D. Three wave disc springs may provide greater load bearing capacity than a single wave washer but may have a smaller deflection range.

Figure 12A:
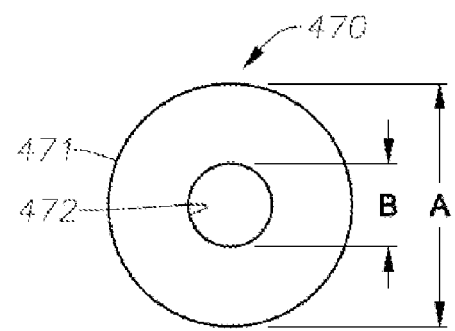
Figure 12B:
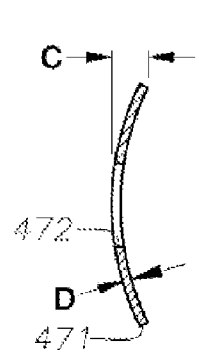

FIG. 12A is a schematic plan view, and FIG. 12B a cross-sectional view, of a prior art single wave (crescent) disc spring 470, having an outer periphery 471 having a diameter A, and an inner through hole 472 having a diameter B, a height C, and material thickness D. This shape disc spring delivers the most consistent spring rate over the widest deflection range.

Figure 13A:
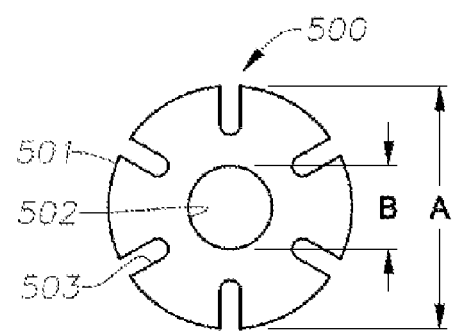
Figure 13B:
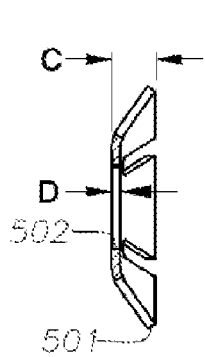

FIG. 13A is a schematic plan view, and FIG. 13B a cross-sectional view, of a prior art 'style 10' disc spring 500, having an outer periphery 501 having a diameter A, and an inner through hole 502 having a diameter B, a height C, and material thickness D. Embodiment 500 is essentially a modified conical disc spring. The disc spring of embodiment 500 enhances spring deflection range while load bearing capacity is moderately reduced from embodiment 250 of FIG. 6.

Figure 14A:
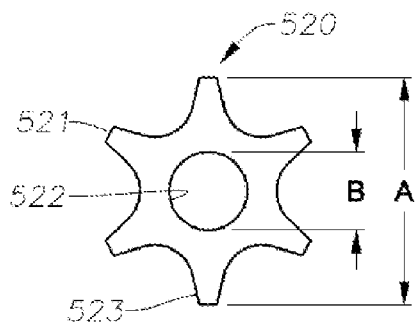
Figure 14B:
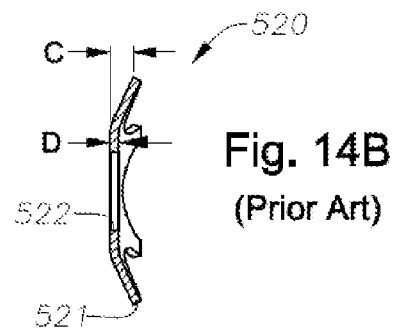

FIG. 14A is a schematic plan view, and FIG. 14B a cross-sectional view, of a prior art 'style 12' disc spring 520, having an outer periphery 521 having a diameter A, an inner through hole 522 having a diameter B, a height C, and material thickness D. Embodiment 520 also includes a plurality of fingers 523 (6 in embodiment 520, although the number could be more or less). Embodiment 520 is a conical spring embodiment having a scalloped periphery that further enhances spring resiliency at the expense of load bearing capacity from embodiment 250 of FIG. 6.

Figure 15A:
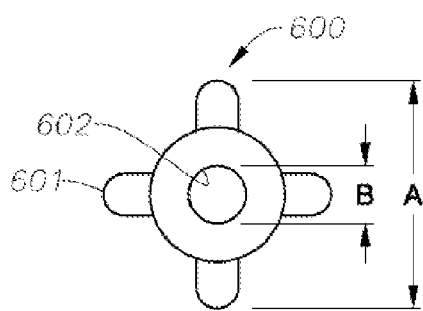
Figure 15B:
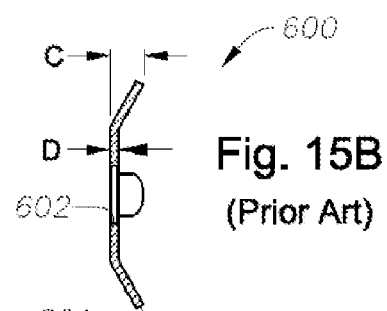

FIG. 15A is a schematic plan view, and FIG. 15B a cross-sectional view, of a prior art 'style 14' disc spring 600, having an outer periphery 601 having a diameter A, and an inner through hole 602 having a diameter B, a height C, and material thickness D. Embodiment 600 is essentially another modified conical disc spring having enhanced spring deflection range while load bearing capacity is reduced from embodiment 250 of FIG. 6.

Disc springs may be comprised of a variety of materials and sizes. Variable include OD, ID, thickness, cone height, total height, ratio of cone height to thickness, weight per 1000 pieces, percent deflection and deflection (length) under force and compression stress. These parameters depend in large part on the valve into which the bias elements are to be used, and the service to which the valve is to be used. Aside from the strictly the valve requirements, Belleville disc springs are available commercially in OD ranging from about 4 mm up to about 250 mm. The thickness is generally categorized as under 1.25 mm (DIN 2093, Group 1, without contact flats); 10.25 mm up to and including 6 mm (DIN 2093 Group 2, without contact flats); and over 6 mm (DIN 2093, Group 3, with contact flats). They may, for example, be manufactured from high quality spring steel strip and forgings, having a standard phosphate and oiled protective surface treatment. Other surface treatments may be dictated by the particular valve service. For example, if corrosion resistance is called for, an inorganic coating comprising aluminum and zinc may be baked onto the disc spring to achieve an electrically conductive and highly corrosion resistant surface finish, or an adhesive organic compound may be applied and then baked onto the disc springs.

To meet certain standards, such as the DIN standards referenced herein, the disc springs may be pre-stressed and the machining and radiusing of the inside and outside diameters performed to remove stress raisers which could otherwise reduce disc spring life. Percent deflection may be about 15 percent, about 30 percent, about 45 percent, about 60 percent, about 75 percent or about 90 percent, with a total deflection ranging from about 0.02 mm up to about 2 mm, at forces ranging from about 20 to about 7600N and compressive stress ranging from about 100 to about 1500 N/mm$^2$.

In certain embodiments the bias elements may comprise coil springs. Coil springs may afford greater deflection and percent deflection than disc springs, and therefore may be advantageous in certain embodiments. If used they may comprise metal, such as high quality steel, such as one or more stainless steels. They may comprise coatings as mentioned herein for disc springs, especially if ball valves described herein in accordance with the present disclosure will be used in corrosive environments.

From the foregoing detailed description of specific embodiments, it should be apparent that patentable methods and apparatus have been described. Although specific embodiments of the disclosure have been described herein in some detail, this has been done solely for the purposes of describing various features and aspects of the methods and apparatus, and is not intended to be limiting with respect to the scope of the methods and apparatus. It is contemplated that various substitutions, alterations, and/or modifications, including but not limited to those implementation variations which may have been suggested herein, may be made to the described embodiments without departing from the scope of the appended claims.

What is claimed is:

1. A double piston, trunnion-mounted ball valve structure comprising:
    a valve body defining an internal cavity and a longitudinal bore;
    a rotatable, longitudinally moveable ball element positioned in the cavity and comprising a fluid flow passage therethrough when in a flow position;
    first and second longitudinally moveable piston seats, the first seat located upstream of the ball element, the second seat located downstream of the ball element;
    a upper trunnion fixedly engaging the ball element, one or more portions of the upper trunnion disposed within one or more first corresponding recesses of the valve body, at least one of the one or more first corresponding recesses containing a bias element exerting force on the upper trunnion in a direction of the first piston seat to oppose a load force acting on the ball element; and
    a lower trunnion fixedly engaging the ball element, one or more portions of the lower trunnion disposed within one or more second corresponding recesses of the valve body, at least one of the one or more second corresponding recesses containing a bias element exerting force on the lower trunnion in a direction of the first piston seat to oppose a load force acting on the ball element.

2. The ball valve structure of claim 1 wherein the valve body comprises a bonnet.

3. The ball valve structure of claim 2 comprising a valve stem rigidly affixed to the upper trunnion and extending through an aperture in the bonnet.

4. The ball valve structure of claim 1 wherein the first and second bias elements comprise materials independently selected from materials: allowing for controlled movement of the ball element within the cavity upon movement of the ball element due to application of the load force causing the ball element to sealingly engage with the downstream piston seat.

5. The ball valve structure of claim 4 wherein the first and second bias elements are independently selected from the group consisting of disc springs, wave springs, crescent springs, and combinations thereof, including stacks of two or more of these springs.

6. The ball valve structure of claim 5 wherein at least one of the first and second bias elements comprises disc springs.

7. The ball valve structure of claim 6 wherein at least one of the disc springs comprises contact flats.

8. The ball valve structure of claim 1 wherein one or more of the first and second bias elements is composite in nature.

9. The ball valve structure of claim 8 wherein the one or more of the first and second bias elements comprise one or more Belleville springs stacked together with one or more springs selected from the group consisting of wave springs and crescent springs.

10. The ball valve structure of claim 8 wherein the one or more Belleville spring stacked together comprises a parallel stack.

11. The ball valve structure of claim 8 wherein the one or more Belleville springs stacked together comprises a series stack.

12. The ball valve structure of claim 8 wherein the one or more Belleville springs stacked together comprises a combination stack, wherein a subset of springs is stacked in parallel, and another subset of springs is stacked in series.

13. The ball valve structure of claim 1 wherein the piston seat located downstream of the ball element is slideable downstream in the valve body until reaching a fixed position where the downstream piston seat contacts the valve body and is then restricted in further downstream movement.

14. The ball valve structure of claim 1 wherein the first and second bias elements comprise Belleville springs.

15. The ball valve structure of claim 1 wherein the one or more portions of the upper trunnion assembly disposed within one or more first corresponding recesses of the valve body and the one or more portions of the lower trunnion assembly disposed within one or more second corresponding recesses of the valve body are selected from:
    a) posts that are integral with their respective trunnions;
    b) posts that are screwed or otherwise mounted into respective trunnions; and
    c) extensions from two separate upper and lower rings or bushings, the upper ring having two extensions extending therefrom 180 degrees apart, and the lower ring or bushing having two extensions extending therefrom 180 degrees apart.

16. A ball valve comprising:
    (a) a housing comprising a valve body and a bonnet which define a cavity (void space) within the housing and also a bore having a longitudinal axis which runs through the bore, the bore allowing for passage of fluids from a higher pressure inlet to the bad valve structure, through the bore, and then from a lower pressure outlet of the ball valve structure when the ball valve structure in a open position;
    (b) a bad element fitting within the cavity of the housing and slideably moveable in both directions along a path aligned and substantially parallel with the longitudinal axis, the ball element disposed within the cavity of the housing such that the ball element may also be rotated between a first position in which the ball element is oriented such that a hollow aperture within the ball body is aligned with the longitudinal axis of the bore, the first position defining the valve open position, and a second position in which the ball element is rotated through approximately 90° such that the ball body fully obstructs the bore, this position defining a valve closed position, the ball element comprising;
  (i) a bad body having the hollow aperture therein, such that when the hollow aperture aligns with the longitudinal axis of the bore in the valve open position, the hollow aperture thereby permits a flow of fluids through the bore;
  (ii) a lower trunnion disposed at a lower end of the ball body and fixedly engaged with the ball body, one or more portions of the lower trunnion being disposed within a recess of the valve body such that the one or more portions of the lower trunnion may slidably move therein, the recess of the valve body receiving a first bias element;
  (iii) the first bias element exerting an opposing force on the one or more portions of the lower trunnion in a direction of the higher pressure inlet side to oppose a load force which acts to push against the ball element from the higher pressure inlet side of the ball valve structure when in the valve closed position;
  (iv) an upper trunnion disposed at an upper end of the ball body and fixedly engaged with the ball body, one or more portions of the upper trunnion being disposed within a recess of the bonnet such that the one or more portions of the upper trunnion may slideably move therein, the recess of the bonnet receiving a second bias element;
  (v) the second bias element exerting an opposing force on the one or more portions of the upper trunnion in a direction of the higher pressure inlet side to oppose a load force which acts to push against the ball element from the higher pressure inlet side of the ball valve structure when in the valve closed position, and
  (vi) a stem rigidly affixed to the upper trunnion and extending through an aperture in the bonnet so that the ball valve structure may be actuated between the valve open position and the valve closed position by rotation of the stem, the stem slideably moveable within the aperture in the bonnet to accommodate movement of the ball element due to the opposing forces and load forces acting on the lower and upper trunnions of the ball element when in the valve closed position;
(c) a first piston seat located at the higher pressure inlet to the ball valve structure and positioned within the valve body such that the first piston seat may slideably move along the longitudinal axis within the valve body, the fluid pressure at the higher pressure inlet being used to exert a load three against the first piston seat such that the first piston seat may sealingly engage with the ball body and exert the load force against the upper trunnion and the lower trunnion, thereby causing movement of the ball element along the longitudinal axis within the housing; and
(d) a second piston seat located at the lower pressure outlet to the ball valve structure and positioned within the valve body such that the second piston seat may slideably move along the longitudinal axis within the valve body until reaching a fixed position where the second piston seat contacts the valve body and is restricted in movement along the longitudinal axis in one direction, and further wherein the movement of the ball element due to application of the load force in (c) causes the ball body to also sealingly engage with the second piston seat, the first and second bias elements allowing for controlled movement of the ball element within the cavity of the housing.

17. The ball valve structure of claim 16 wherein the bias elements comprise Belleville springs.

18. A method for creating a seal in a double piston-type trunnion ball valve comprised of a ball element with an aperture therein defining a bore for fluid communication between an inlet and outlet to the ball valve when in a valve open position, the bore also aligned with a longitudinal axis that lies within the bore and aligned in the direction of fluid flow when in a valve open position, a first piston seat located at the inlet to the ball valve having a higher fluid pressure when in a valve closed position, and a second piston seat located at the outlet to the ball valve having a lower fluid pressure when in the valve closed position, the method comprising:
    rotating the ball element to the valve closed position until the higher fluid pressure at the inlet to the ball valve creates a load force that is applied to the first piston seat so that the first piston seat sealingly engages with the ball element and creates a first seal, the load force also causing the ball element to move due to application of the load force and thereby sealingly engage with the second piston seat and create a second seal;
    fixedly engaging an upper trunnion to the ball element, one or more portions of the upper trunnion disposed within one or more corresponding first recesses of the valve body, at least one or more corresponding first recesses containing a bias element exerting force on the upper trunnion in a direction of the piston seat to oppose a load force acting on the ball element;
    fixedly engaging an lower trunnion to the hall element, one or more portions of the lower trunnion disposed within one or more corresponding second recesses of the valve body, at least one or more corresponding second recesses containing a bias element exerting force en the lower trunnion in a direction of the piston seat to oppose a load force acting on the ball element; and
    applying an opposing force to the ball element such that movement of the ball element is controlled.

19. The method of claim 18 comprising biasing the upper trunnion and the lower trunnion fixed to the ball element.

20. The method of claim 19 wherein the biasing comprises compressing one or more Belleville springs.

21. The method of claim 18 comprising applying a counter load force to the second piston seat using the lower pressure fluid at the outlet of the ball valve so that the second piston seat sealingly engages with the ball element and creates a second seal.

22. The method of claim 21 comprising moving the ball body until the second piston seat reaches a fixed position.

23. The method of claim 22 comprising the second piston seat engaging and making contact with the valve body at the fixed position that houses the ball element.

* * * * *